US012753868B1

(12) United States Patent
Chiang

(10) Patent No.: US 12,753,868 B1

(45) Date of Patent: Oct. 6, 2026

(54) QUICK SAFETY CONNECTOR

(71) Applicant: JENG SHENG CO., LTD., Taichung (TW)

(72) Inventor: Kuo-Chin Chiang, Taichung City (TW)

(73) Assignee: JENG SHENG CO., LTD., Taichung City (TW)

( * ) Notice: Subject to any disclaimer, the term of this patent is extended or adjusted under 35 U.S.C. 154(b) by 0 days.

(21) Appl. No.: 19/267,939

(22) Filed: Jul. 14, 2025

(51) Int. Cl.
*F16L 37/086* (2006.01)

(52) U.S. Cl.
CPC .................................. *F16L 37/086* (2013.01)

(58) Field of Classification Search
CPC ...... F16L 37/086; F16L 37/0915; F16L 37/23
See application file for complete search history.

(56) References Cited

U.S. PATENT DOCUMENTS 4,311,328 A * 1/1982 Truchet .................. F16L 37/23 285/308
4,366,945 A * 1/1983 Blauenstein ............ F16L 37/23 251/149.6
4,483,510 A * 11/1984 Palau .................... F16L 37/086 251/149.6
5,002,254 A * 3/1991 Belisaire ................. F16L 37/23 251/149.8
5,806,832 A * 9/1998 Larbuisson ........... F16L 37/086 251/149.6
6,412,828 B1 * 7/2002 Lacroix ................... F16L 37/23 285/86
6,840,548 B2 * 1/2005 Lacroix ................. F16L 37/086 285/308
9,464,742 B2 * 10/2016 Taguchi .................. F16L 37/23
9,528,649 B2 * 12/2016 Aoki ..................... F16L 37/086
11,754,214 B2 * 9/2023 Le Quere .............. F16L 37/086 285/317
12,331,865 B1 * 6/2025 Hsu ....................... F16L 37/086
2008/0265574 A1 * 10/2008 Tiberghien ............ F16L 37/086 285/328
2020/0386357 A1 * 12/2020 Taguchi ................ F16L 37/086

* cited by examiner

*Primary Examiner* — Matthew Troutman
*Assistant Examiner* — Fannie Kee
(74) *Attorney, Agent, or Firm* — MUNCY, GEISSLER, OLDS & LOWE, P.C.

(57) ABSTRACT

A quick safety connector is provided, wherein the quick safety connector includes: an outer barrel including a lateral hole; an axially-movable assembly received in the axial hole, including an insertion slot, perforation, detent member received in the perforation and a radial projection; and a control assembly movably inserted in the lateral hole, including first and second blocking portions, the first blocking portion being greater than the second blocking portion; wherein when the axially-movable assembly is located in a first locking position, the detent member is abutted by the outer barrel and partially within the insertion slot; when the axially-movable assembly is located in a second locking position, the detent member is abutted by the outer barrel and partially located within the insertion slot; and when the axially-movable assembly is located in a release position, the detent member is movable radially outward relative to the insertion slot.

8 Claims, 6 Drawing Sheets

QUICK SAFETY CONNECTOR

BACKGROUND OF THE INVENTION

Field of the Invention

The present invention relates to a connector, particularly to a quick safety connector.

Description of the Prior Art

Many tools utilize high-pressure fluid as driving power, and a quick connector is typically used to connect between the tool and a high-pressure fluid source, thereby enabling simple and rapid connection and disconnection.

Conventional quick connectors disengage a pipe plug by means of a sleeve slidably disposed on the outside of a tube body, thereby achieving quick insertion or detachment. However, during insertion of the pipe plug into the quick connector, the high-pressure fluid inside the quick connector is conducted even before the pipe plug is fully locked in position. Additionally, after the sleeve is moved to release the pipe plug, the pipe plug may be directly ejected by the pressure of the high-pressure fluid, potentially causing injury or equipment damage, thereby posing an urgent safety issue.

The present invention is, therefore, arisen to obviate or at least mitigate the above-mentioned disadvantages.

SUMMARY OF THE INVENTION

The main object of the present invention is to provide a quick safety connector that enables two-stage removal of a pipe plug such that the pipe plug is not directly ejected, thereby avoiding injury or equipment damage and offering excellent safety.

To achieve the above and other objects, a quick safety connector is provided, wherein the quick safety connector includes: an outer barrel including an axial hole extending therethrough, and a lateral hole in communication with the axial hole; an axially-movable assembly received in the axial hole and movable in an axial direction to a first locking position, a second locking position or a release position, including an insertion slot, at least one perforation in communication with the insertion slot, at least one detent member received in the at least one perforation and a radial projection, the insertion slot being configured to receive a pipe plug, the radial projection including a first side and a second side; and a control assembly movably inserted in the lateral hole, including a first blocking portion and a second blocking portion, a diametric dimension of the first blocking portion in the axial direction being greater than a diametric dimension of the second blocking portion in the axial direction; wherein when the axially-movable assembly is located in the first locking position, the first blocking portion abuts the first side, the second blocking portion is spaced apart from the first side, and the at least one detent member is abutted by the outer barrel and partially located within the insertion slot; wherein when the control assembly moves to cause the first side to no longer be abutted by the first blocking portion, the axially-movable assembly is movable to the second locking position such that the second blocking portion abuts the first side, and the at least one detent member is abutted by the outer barrel and partially located within the insertion slot; wherein when the control assembly moves to cause the axially-movable assembly to be located in the release position, the first side is not abutted by either the first blocking portion or the second blocking portion, and the at least one detent member is movable radially outward relative to the insertion slot.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
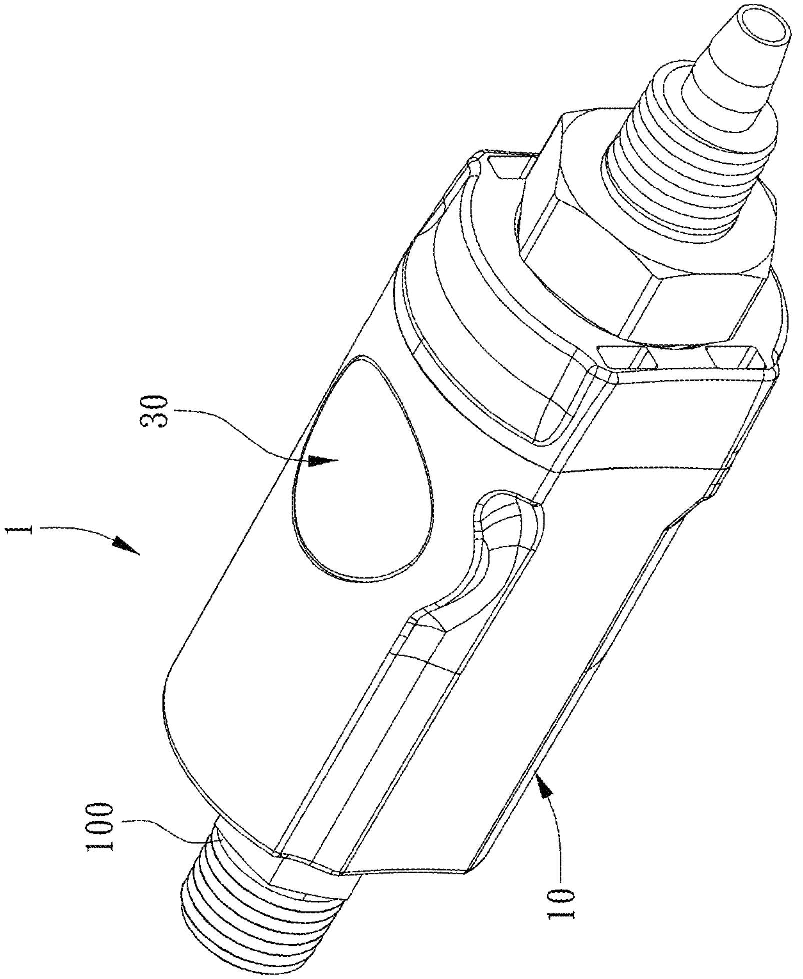
FIG. 1 is a perspective view of an exemplary embodiment of the present invention.
Figure 2:
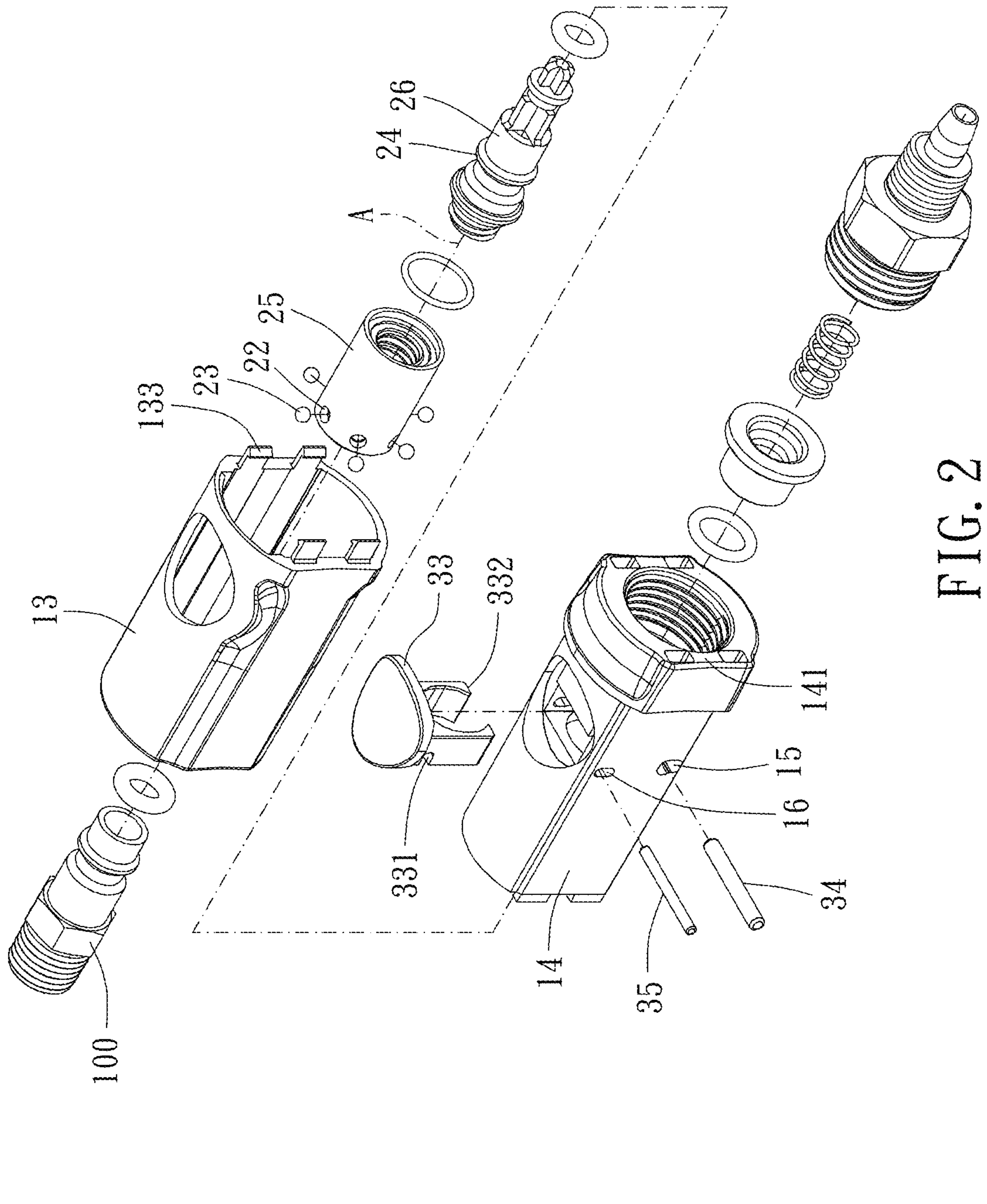
FIG. 2 is an exploded view of an exemplary embodiment of the present invention.
Figure 3:
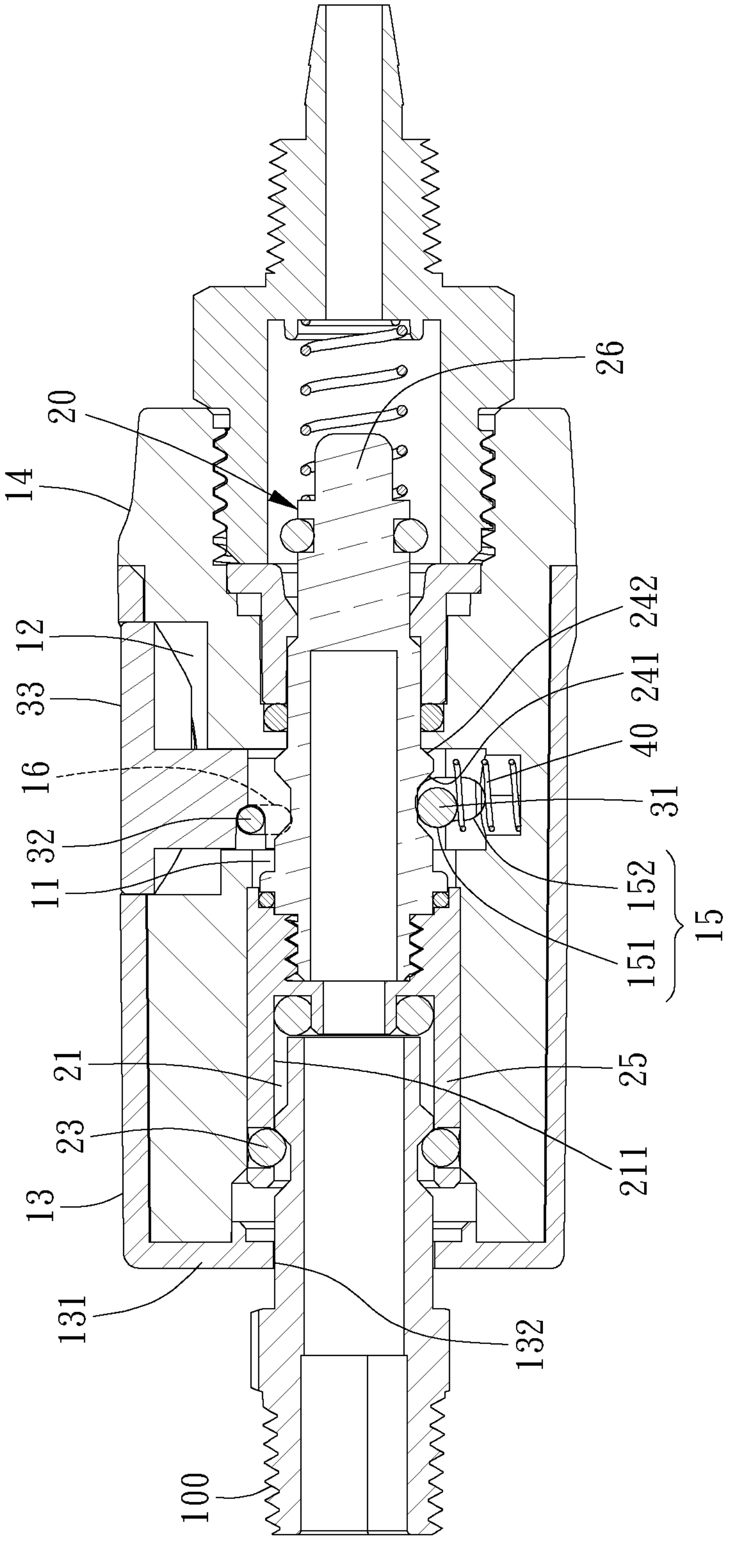
FIG. 3 is a cross-sectional view of an exemplary embodiment of the present invention.
Figure 4:
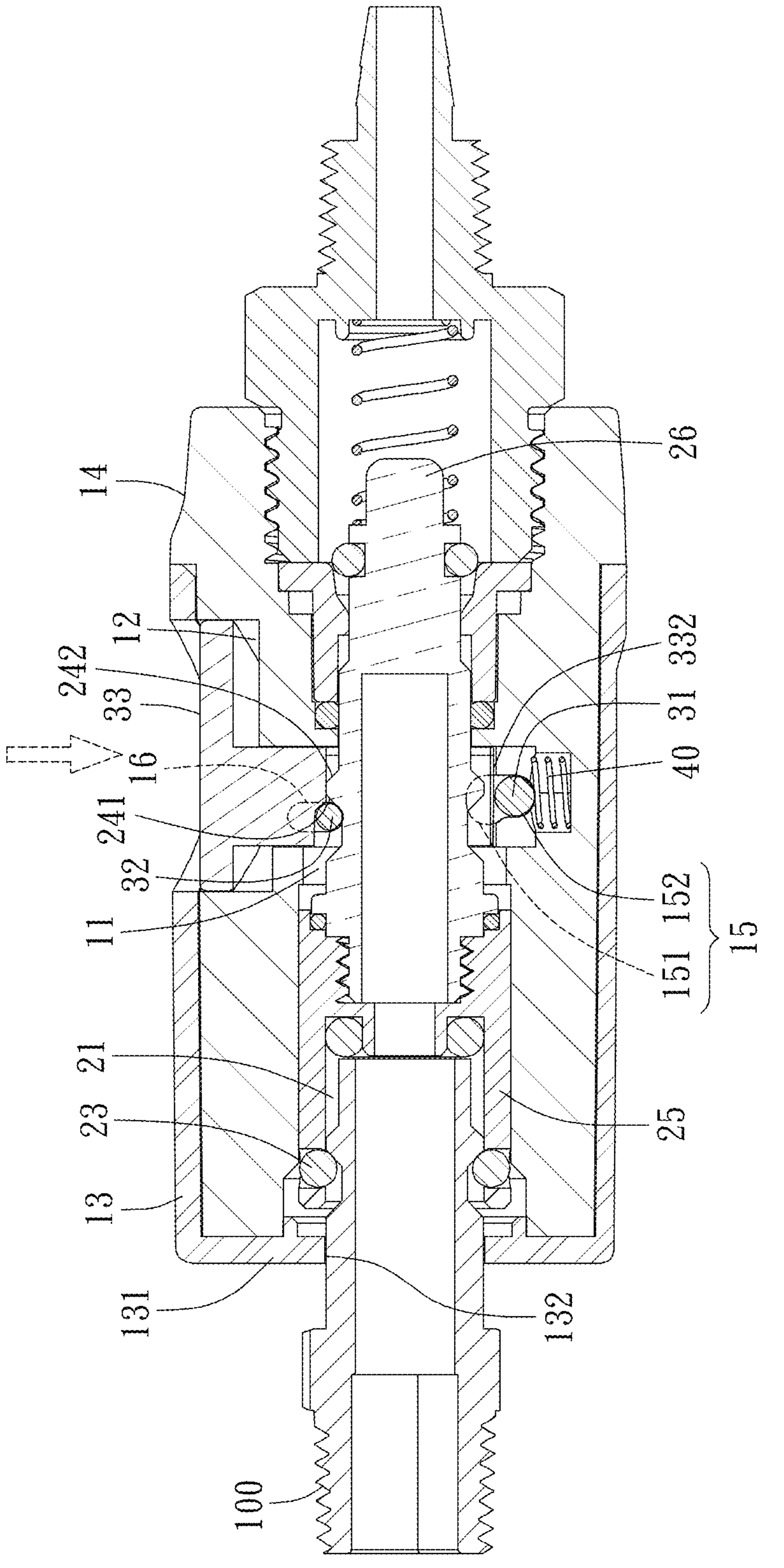
FIGS. 4 to 5 are schematic operational diagrams of an exemplary embodiment of the present invention.
Figure 5:
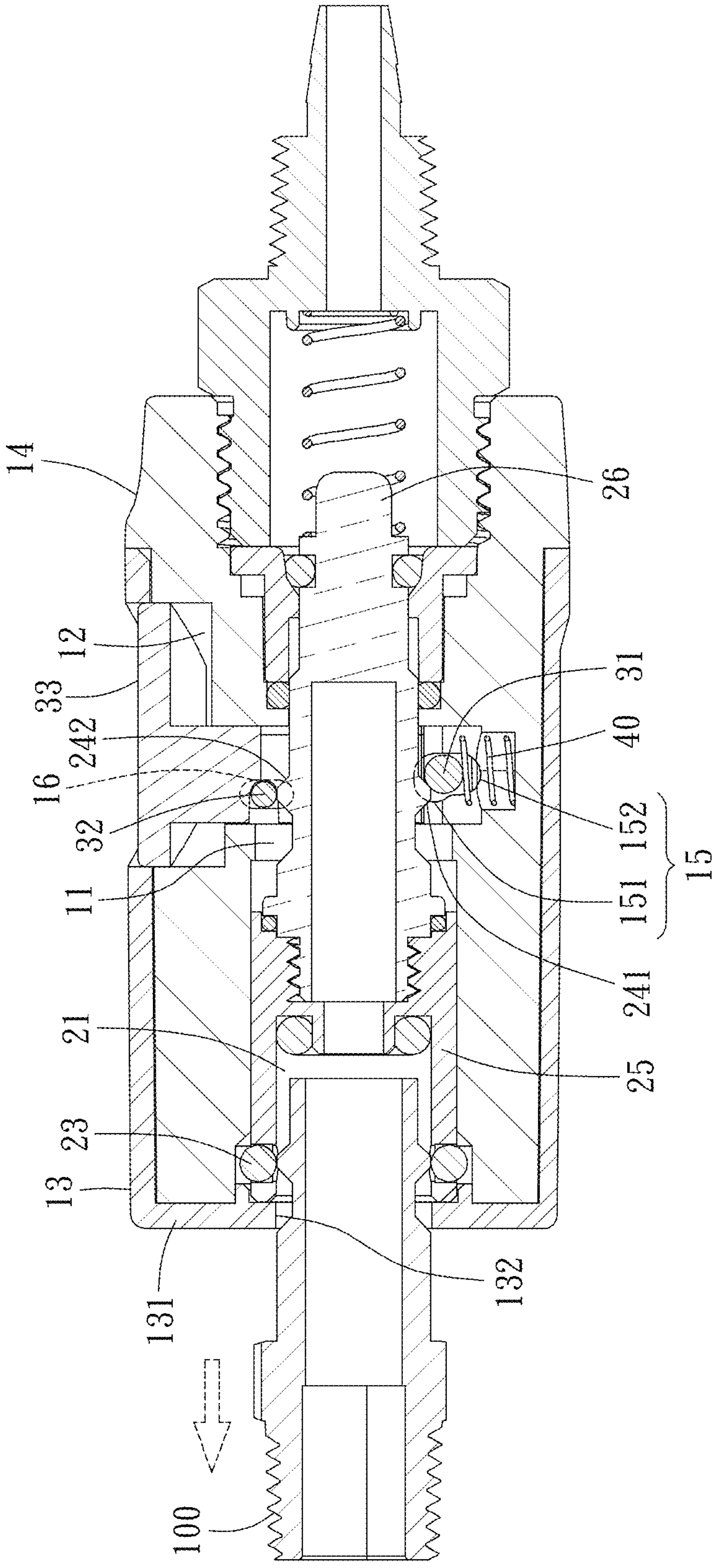

Please refer to FIGS. 1 to 5 for an exemplary embodiment of the present invention. A quick safety connector 1 of the present invention includes an outer barrel 10, an axially-movable assembly 20, and a control assembly 30.

The outer barrel 10 includes an axial hole 11 extending therethrough and a lateral hole 12 in communication with the axial hole 11. The axially-movable assembly 20 is received in the axial hole 11 and is movable in an axial direction A to a first locking position, a second locking position, or a release position. The axially-movable assembly 20 includes an insertion slot 21, at least one perforation 22 in communication with the insertion slot 21, at least one detent member 23 received in the at least one perforation 22, and a radial projection 24. The insertion slot 21 is configured to receive a pipe plug 100. The radial projection 24 includes a first side 241 and a second side 242. The control assembly 30 is movably inserted in the lateral hole 12. The control assembly 30 includes a first blocking portion 31 and a second blocking portion 32. The diametric dimension of the first blocking portion 31 in the axial direction A is greater than the diametric dimension of the second blocking portion 32 in the axial direction A. Preferably, the number of the at least one perforation 22 and the at least one detent member 23 is plural to provide stable and reliable detent performance. When the axially-movable assembly 20 is located in the first locking position (FIG. 3), the first blocking portion 31 abuts the first side 241, the second blocking portion 32 is spaced apart from the first side 241, and the at least one detent member 23 is abutted by the outer barrel 10 and partially protrudes into the insertion slot 21. When the control assembly 30 moves such that the first side 241 is not abutted by the first blocking portion 31, the axially-movable assembly 20 is movable to the second locking position (FIG. 4), so that the second blocking portion 32 abuts the first side 241. The at least one detent member 23 is abutted by the outer barrel 10 and partially protrudes into the insertion slot 21, so the pipe plug 100 would not directly ejected by the action of the high-pressure fluid and may simultaneously release subsequent fluid pressure. When the control assembly 30 moves such that the axially-movable assembly 20 is located in the release position (FIG. 5), the first side 241 is not abutted by either the first blocking portion 31 or the second blocking portion 32, and the at least one detent member 23 is movable radially outward relative to the insertion slot 21, so that the pipe plug 100 can be separated from the outer barrel 10. Therefore, two-stage removal of the pipe plug 100 can be achieved, and the pipe plug 100 is not directly ejected, thereby avoiding injury or equipment damage and offering excellent safety.

The outer barrel 10 includes a first tubular member 13 and a second tubular member 14 sleeved to each other. The first tubular member 13 includes a radially-extending wall 131. The axial hole 11 extends through the radially-extending wall 131. A radial inner end 132 of the radially-extending wall 131 corresponds to a slot wall 211 of the insertion slot 21 in the axial direction A, thereby limiting the at least one detent member 23 from exiting the axial hole 11. One of the first tubular member 13 and the second tubular member 14 includes at least one buckle hole 141, and the other of the first tubular member 13 and the second tubular member 14 includes at least one buckle member 133. The at least one buckle member 133 is buckled in the at least one buckle hole 141 to facilitate assembly, replacement and maintenance. In this embodiment, the first tubular member 13 is sleeved on the outside of the second tubular member 14 and includes the at least one buckle member 133.

Figure 6:
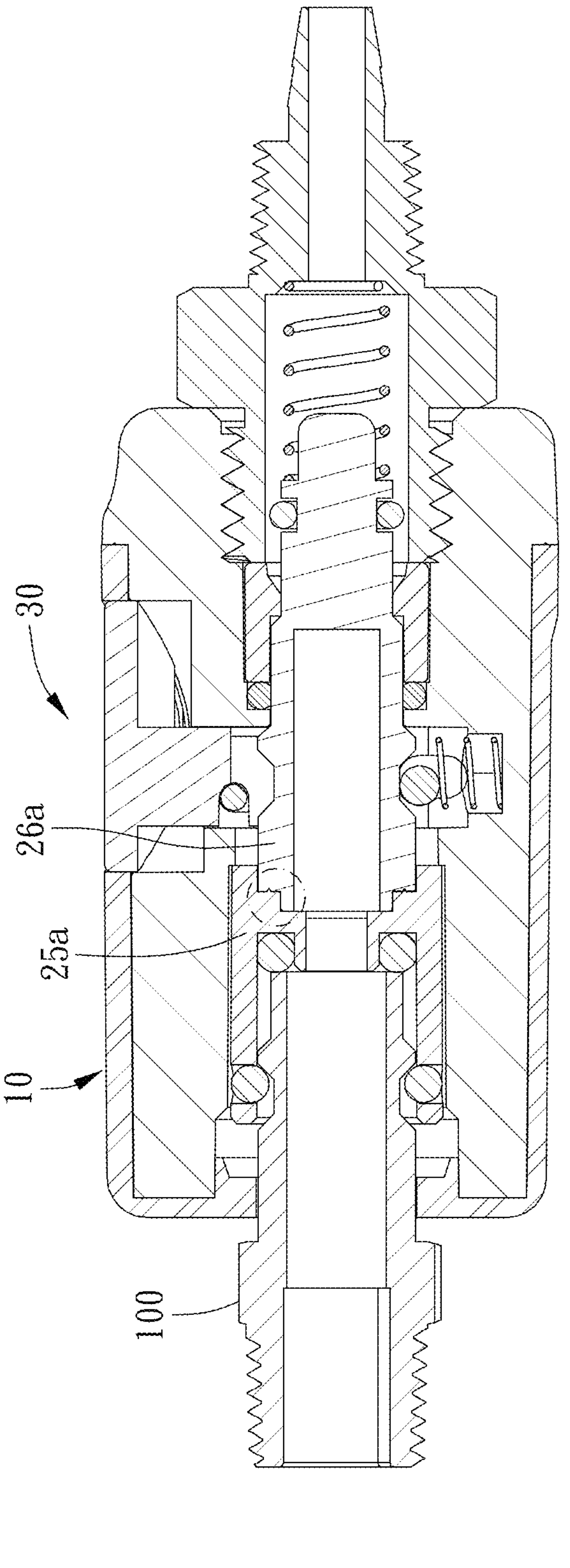
FIG. 6 is a cross-sectional view of another exemplary embodiment of the present invention.
Figure 7:
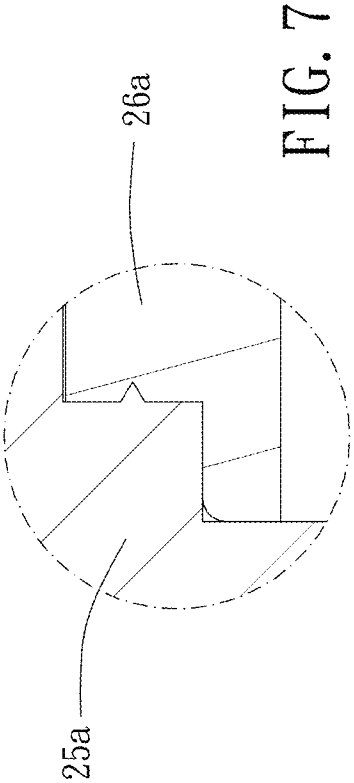
FIG. 7 is a partial enlarged view of FIG. 6.

The axially-movable assembly 20 further includes a first shaft 25 and a second shaft 26 connected to each other in the axial direction. The first shaft 25 includes the insertion slot 21, the at least one perforation 22, and the at least one detent member 23. The second shaft 26 includes the radial projection 24. Preferably, the first shaft 25 and the second shaft 26 are screwed to each other. A desired size of the insertion slot 21 may be selected for the first shaft 25 to facilitate assembly, replacement, and maintenance. Alternatively, the first shaft **25*a* and the second shaft 26*a* may be fixedly connected after insertion (refer to FIGS. 6 and 7**), such as by thermal welding, high-frequency welding, adhesive bonding, or other securing methods, to provide good bonding and structural strength.

In this embodiment, the first blocking portion 31 and the second blocking portion 32 are offset in the axial direction A, and the first blocking portion 31 is closer to the first side 241 than the second blocking portion 32. The first blocking portion 31 can reliably abut the first side 241. The outer barrel 10 further includes a first groove 15 and a second groove 16. The control assembly 30 further includes an operation member 33 inserted through the lateral hole 12, and two pins 34, 35. The two pins 34, 35 includes the first blocking portion 31 and the second blocking portion 32, respectively, and are inserted through the first groove 15 and the second groove 16, respectively. The two pins 34, 35 are configured to be driven radially by the operation member 33, thereby enabling two-stage release of the pipe plug 100.

Specifically, the operation member 33 includes a blocking slot 331 and at least one push end portion 332. The pin 35 is engaged in the blocking slot 331 and moves in unison with the operation member 33. The at least one push end portion 332 is configured to push the pin 34 to move in a direction radially away from the axially-movable assembly 20 to lock or release the axially-movable assembly 20. Preferably, the quick safety connector 1 further includes an elastic member 40. The elastic member 40 is disposed between the outer barrel 10 and the control assembly 30, and elastically urges the control assembly 30 such that the first blocking portion 31 is pushed toward the axially-movable assembly 20, thereby ensuring stable locking of the axially-movable assembly 20.

Preferably, the first groove 15 includes a large diameter section 151 and a small diameter section 152. In the axial direction A, the width of the large diameter section 151 is greater than the width of the small diameter section 152. The pin 34 is slidable between the large diameter section 151 and the small diameter section 152. When the axially-movable assembly 20 is located in the first locking position (FIG. 3), the pin 34 may axially abut one side of the large diameter section 151, such that the first blocking portion 31 stably abuts the axially-movable assembly 20 and is not easily loosened due to vibration or improper operation.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A quick safety connector including:

an outer barrel including an axial hole extending therethrough, and a lateral hole in communication with the axial hole;

an axially-movable assembly received in the axial hole and movable in an axial direction to a first locking position, a second locking position or a release position, including an insertion slot, at least one perforation in communication with the insertion slot, at least one detent member received in the at least one perforation and a radial projection, the insertion slot being configured to receive a pipe plug, the radial projection including a first side and a second side; and a control assembly movably inserted in the lateral hole, including a first blocking portion and a second blocking portion, a diametric dimension of the first blocking portion in the axial direction being greater than a diametric dimension of the second blocking portion in the axial direction;

wherein when the axially-movable assembly is located in the first locking position, the first blocking portion abuts the first side, the second blocking portion is spaced apart from the first side, and the at least one detent member is abutted by the outer barrel and partially located within the insertion slot;

wherein when the control assembly moves to cause the first side to no longer be abutted by the first blocking portion, the axially-movable assembly is movable to the second locking position such that the second blocking portion abuts the first side, and the at least one detent member is abutted by the outer barrel and partially located within the insertion slot;

wherein when the control assembly moves to cause the axially-movable assembly to be located in the release position, the first side is not abutted by either the first blocking portion or the second blocking portion, and the at least one detent member is movable radially outward relative to the insertion slot;

wherein the outer barrel includes a first tubular member and a second tubular member sleeved with each other, the first tubular member includes a radially-extending wall, the axial hole extends through the radially-extending wall, and a radial inner end of the radially-extending wall corresponds to a slot wall of the insertion slot in the axial direction; and wherein one of the first tubular member and the second tubular member includes at least one buckle hole, and the other of the first tubular member and the second tubular member includes at least one buckle member, and the at least one buckle member is buckled in the at least one buckle hole.

2. The quick safety connector of claim 1, wherein the first blocking portion and the second blocking portion are offset in the axial direction, and the first blocking portion is closer to the first side than the second blocking portion in the first locking position.

3. A quick safety connector including:

an outer barrel including an axial hole extending therethrough, and a lateral hole in communication with the axial hole;

an axially-movable assembly received in the axial hole and movable in an axial direction to a first locking position, a second locking position or a release position, including an insertion slot, at least one perforation in communication with the insertion slot, at least one detent member received in the at least one perforation and a radial projection, the insertion slot being configured to receive a pipe plug, the radial projection including a first side and a second side; and a control assembly movably inserted in the lateral hole, including a first blocking portion and a second blocking portion, a diametric dimension of the first blocking portion in the axial direction being greater than a diametric dimension of the second blocking portion in the axial direction;

wherein when the axially-movable assembly is located in the first locking position, the first blocking portion abuts the first side, the second blocking portion is spaced apart from the first side, and the at least one detent member is abutted by the outer barrel and partially located within the insertion slot;

wherein when the control assembly moves to cause the first side to no longer be abutted by the first blocking portion, the axially-movable assembly is movable to the second locking position such that the second blocking portion abuts the first side, and the at least one detent member is abutted by the outer barrel and partially located within the insertion slot;

wherein when the control assembly moves to cause the axially-movable assembly to be located in the release position, the first side is not abutted by either the first blocking portion or the second blocking portion, and the at least one detent member is movable radially outward relative to the insertion slot; and wherein the axially-movable assembly further includes a first shaft and a second shaft connected to each other in the axial direction, the first shaft includes the insertion slot, the at least one perforation and the at least one detent member, and the second shaft includes the radial projection.

4. The quick safety connector of claim 3, wherein the first shaft and the second shaft are screwed to each other.

5. A quick safety connector including:

an outer barrel including an axial hole extending therethrough, and a lateral hole in communication with the axial hole;

an axially-movable assembly received in the axial hole and movable in an axial direction to a first locking position, a second locking position or a release position, including an insertion slot, at least one perforation in communication with the insertion slot, at least one detent member received in the at least one perforation and a radial projection, the insertion slot being configured to receive a pipe plug, the radial projection including a first side and a second side; and a control assembly movably inserted in the lateral hole, including a first blocking portion and a second blocking portion, a diametric dimension of the first blocking portion in the axial direction being greater than a diametric dimension of the second blocking portion in the axial direction;

wherein when the axially-movable assembly is located in the first locking position, the first blocking portion abuts the first side, the second blocking portion is spaced apart from the first side, and the at least one detent member is abutted by the outer barrel and partially located within the insertion slot;

wherein when the control assembly moves to cause the first side to no longer be abutted by the first blocking portion, the axially-movable assembly is movable to the second locking position such that the second blocking portion abuts the first side, and the at least one detent member is abutted by the outer barrel and partially located within the insertion slot;

wherein when the control assembly moves to cause the axially-movable assembly to be located in the release position, the first side is not abutted by either the first blocking portion or the second blocking portion, and the at least one detent member is movable radially outward relative to the insertion slot; and wherein the outer barrel further includes a first groove and a second groove, the control assembly further includes an operation member inserted through the lateral hole and two pins, the two pins include the first blocking portion and the second blocking portion, respectively, and the two pins are inserted through the first groove and the second groove, respectively, and are configured to be driven to move radially by the operation member.

6. The quick safety connector of claim 5, wherein the operation member includes a blocking slot and at least one push end portion, one of the two pins is embedded in the blocking slot and moves in unison with the operation member, and the at least one push end portion is configured to push the other of the two pins to move in a direction radially away from the axially-movable assembly.

7. The quick safety connector of claim 6, further including an elastic member, wherein the elastic member is disposed between the outer barrel and the control assembly, and the elastic member elastically urges the control assembly such that the first blocking portion is pushed toward the axially-movable assembly.

8. The quick safety connector of claim 5, wherein the first groove includes a large diameter section and a small diameter section, a width of the large diameter section in the axial direction is greater than a width of the small diameter section in the axial direction, and one of the two pins is slidable between the large diameter section and the small diameter section.

* * * * *